United States Patent [19]
Teutsch

[11] 3,872,092
[45] Mar. 18, 1975

[54] NOVEL $\Delta^{9,11}$-GONADIENE-5α-OLS
[75] Inventor: Jean Georges Teutsch, Le Blanc-Mesnil, France
[73] Assignee: Roussel Uclaf, Paris, France
[22] Filed: Jan. 15, 1974
[21] Appl. No.: 433,569

[30] Foreign Application Priority Data
Jan. 29, 1973 France .................. 73.2991

[52] U.S. Cl. ............... 260/239.55 C, 260/239.55 R
[51] Int. Cl. .......................................... C07c 173/00
[58] Field of Search ...... /Machine Searched Steroids

[56] References Cited
OTHER PUBLICATIONS
Dferassi – Steroid Reactions, p. 241, (1963).

*Primary Examiner*—Henry A. French
*Attorney, Agent, or Firm*—Hammond & Littell

[57] ABSTRACT

Novel $\Delta^{9,11}$-gonadiene-5α-ols of the formula

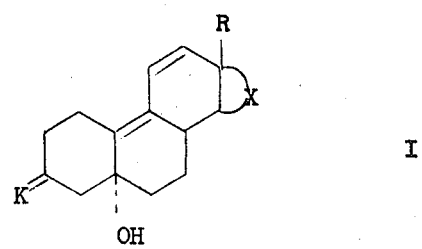

I wherein R is alkyl of 1 to 4 carbon atoms, K is a blocked ketone in the form of a ketal, thioketal or methyloxime, preferably a ketal, and X is the rest of a pentagonal ring optionally substituted and their preparation which are useful intermediates for the preparation of $\Delta^{4,9,11}$-gonatrienes.

5 Claims, No Drawings

NOVEL $\Delta^{9,11}$-GONADIENE-5α-OLS

OBJECTS OF THE INVENTION

It is an object of the invention to provide the novel $\Delta^{9,11}$-gonadiene-5α-ols of formula I.

It is another object of the invention to provide a novel process for the preparation of the compounds of formula I.

It is a further object of the invention to provide a novel process for the preparation of $\Delta^{4,9,11}$-gonatrienes starting from the compounds of formula I.

These and other objects and advantages of the invention will become obvious from the following detailed description.

THE INVENTION

The novel $\Delta^{9,11}$-gonadiene-5α-ols of the invention have the formula

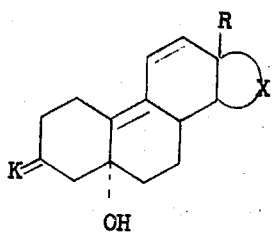

wherein R is alkyl of 1 to 4 carbon atoms, X is the residue of a pentagonal ring optionally substituted and K is a blocked ketone in the form of a member selected from the group consisting of ketal, thioketal and methyloxime.

A preferred group of compounds of formula I are $\Delta^{9,11}$-gonadiene-5α-ols of the formula

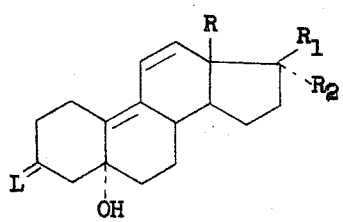

wherein R is alkyl of 1 to 4 carbon atoms, L is a ketal group, $R_1$ is selected from the group consisting of OH, alkyloxy of 1 to 5 carbon atoms, alkenyloxy of 2 to 5 carbon atoms, acyloxy of 1 to 12 carbon atoms and tetrahydropyranyloxy and $R_2$ is selected from the group consisting of hydrogen, alkyl of 1 to 5 carbon atoms and alkenyl and alkynyl of 2 to 4 carbon atoms or $R_1$ may be acyl of 2 to 4 carbon atoms with the =O in its free form or blocked in the form of a ketal and $R_2$ is selected from the group consisting of hydrogen, —OH and acyloxy or $R_1$ and $R_2$ form a ketalized ketone.

Preferably R is methyl, ethyl, propyl or isopropyl. $R_1$ may be alkoxy of 1 to 5 carbon atoms such as methoxy, ethoxy, propoxy; isopropoxy, etc or alkenyloxy of 2 to 5 carbon atoms such as butenyloxy or isobutenyloxy.

Examples of suitable acids of 1 to 12 carbon atoms for $R_1$ as acyloxy are saturated or unsaturated aliphatic or cycloaliphatic carboxylic acids such as alkanoic acids such as formic acid, acetic acide, propionic acid, butyric acid, isobutyric acid or undecylic acid; cycloalkyl carboxylic acids or cycloalkylalkanoic acids such as cyclopropylcarboxylic acid, cyclopentylcarboxylic acid, cyclohexylcarboxylic acid, cyclopentylacetic acid, cyclopentylpropionic acid, cyclohexylacetic acid or cyclohexylpropionic acid; benzoic acid or phenylalkanoic acids such as phenylacetic acid or phenylpropionic acid; or amino acids such as diethylaminoacetic acid or aspartic acid.

$R_2$ may be alkyl such as methyl, ethyl, propyl or isopropyl; alkenyl such as vinyl, allyl, 2'-methyl allyl or isobutenyl; or alkynyl such as ethynyl, 1-propynyl, 2-propynyl, 2-butynyl or butadiynyl.

The invention is particularly concerned with $\Delta^{9,11}$-gonadiene-5α-ols in which the ketal in the 3-position and, as the case may be, the ketal in the 17- and 20-positions are

groups wherein Y and Z are alkyl of 1 to 4 carbon atoms or together form an alkylene of 2 to 4 carbon atoms. Two specific compounds are 3,20-bis-(ethylenedioxy)-19-nor-$\Delta^{9,11}$-pregnadiene-5α,17α-diol and 3-(ethylenedioxy)-$\Delta^{9,11}$-estradiene-5α,17β-diol.

The novel process of the invention for the preparation of compounds of formula I comprises reacting a compound of the formula

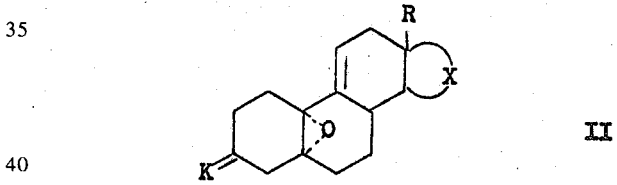

wherein K, R and X have the above definitions with a strong base in an aprotic dipolar solvent to obtain the corresponding compound of formula I.

For the preparation of a compound of formula Ia, a compound of the formula

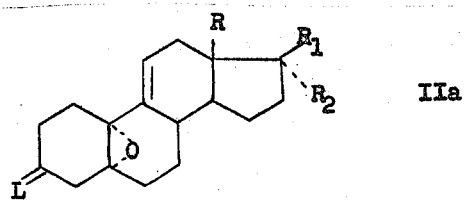

wherein L, R, $R_1$ and $R_2$ have the above definitions as reacted with a strong base in an aprotic dipolar solvent.

The strong base is preferably an alkali metal derivative such as potassium tert.-butylate, sodium amide, potassium hydroxide, potassium acetylide or lithium acetylide in the presence of ethylenediamine. The aprotic dipolar solvent is preferably tetrahydrofuran, dioxane, dimethoxyethane, ethylenediamine, dimethylsulfoxide or hexamethylphosphorotriamide. The preferred reactants are potassium tert.-butylate in tetrahydrofuran.

The compounds of formula II are known and can be made by known methods. For example, French Pat. No. 1,550,974 teaches reacting a 13β-alkyl-$\Delta^{5(10),9(11)}$-gonadiene with an epoxidation agent such as peracetic acid, perphthalic acid or m-chloroperbenzoic acid. The products can also be prepared by reacting a $\Delta^{5(10),9(11)}$-gonadiene compound with the 3-ketone blocked in the form of a ketal with the hydroperoxide of hexafluoroacetone to obtain the corresponding 3-ketal-5α, 10α-epoxy-$\Delta^{9(11)}$-gonene.

The compounds of formula I may be used to prepare $\Delta^{4,9,11}$-gonatrienes which is also a part of the invention by reacting a compound of formula I with an acid agent in an aqueous media to obtain a compound of the formula

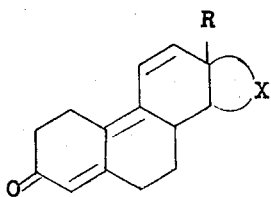

III wherein R and X have the above definitions.

The compounds of formula Ia can be reacted with an acid agent in an aqueous media to obtain a compound of the formula

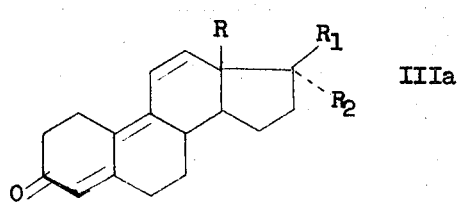

IIIa wherein R, $R_1$ and $R_2$ have the above definitions.

The acid agent is preferably a sulfonic acid resin or a carboxylic acid resin in the acid form but may be a mineral acid in aqueous media such as hydrochloric acid, sulfuric acid or perchloric acid or a carboxylic acid such as acetic acid, formic acid, citric acid or trichloroacetic acid or mixtures of these acids. Also useful are alkyl sulfonic acids such as methane sulfonic acid or ethane sulfonic acid or arylsulfonic acids such as p-toluenesulfonic acid.

The compounds of formula I are produced in good yields from the compounds of formula II and they permits direct preparation of the corresponding 13β-alkyl-$\Delta^{4,9,11}$-gonatrienes in excellent yields.

The compounds of formula I have a certain industrial interest since the 13β-alkyl-$\Delta^{4,9,11}$-gonatrienes of formula III have been described in numerous publications as having very interesting pharmacological properties, notably anabolisant and androgenic activity, estrogenic, progestomimetic and hypophysial inhibiting activity making them useful in human and animal medicines. Some of the publications c. Velluz, C. R. Acad. Sci., 264 C, 1396 (1967); Feyel-Cabannes, Ann. Endocrinol., Vol. 26 (1965), p. 95; and Tremolieres et al, Bull. Acad. Nat. Med., Vol. 149 (1965), p. 14.

In the following examples there are described several preferred embodiments to illustrate the invention. However, it should be understood that the invention is not intended to be limited to the specific embodiments.

EXAMPLE 1

3,20-bis-(ethylenedioxy)-19-nor-$\Delta^{9,11}$-pregnadiene-5α, 17α-diol

STEP A:

3,20-bis-(ethylenedioxy)-19-nor-$\Delta^{5(10),9(11)}$-pregnadiene-17α-ol 3.49 g of 3,3-ethylenedioxy-19-nor-$\Delta^{5(10),9(11)}$-pregnadiene-17α-ol-20-one [prepared by method of Canadian Pat. No. 801,724] were added to a solution of 35 ml of methylene chloride, 35 ml of glycol and 17.5 ml of ethyl orthoformate and 260 mg of p-toluene sulfonic acid were added thereto. After 2 hours of reaction at 20°–25°C, the solution was neutralized with an excess of sodium bicarbonate and the methylene chloride and ethyl orthoformate were evaporated under reduced pressure. The reaction mixture was poured into iced water and held for 2 hours under a nitrogen atmosphere. The mixture was vacuum filtered and the recovered precipitate was washed with water and dried at 50°C under reduced pressure to obtain 3.868 g of 3,20-bis-(ethylenedioxy)-19-nor-$\Delta^{5(10),9(11)}$-pregnadiene-17α-ol melting at 173°C.

Analysis: $C_{24}H_{34}O_5$; molecular weight = 402.51:
Calculated: %C 71.61; %H 8.51.
Found: %C 71.3; %H 8.5.

STEP B:

3,20-bis-(ethylenedioxy)-5α,10α-epoxy-19-nor-$\Delta^{9(11)}$-pregnene-17α-ol 43.8 g of 3,20-bis-(ethylenedioxy)-19-nor-$\Delta^{5(10),9(11)}$-pregnadiene-17α-ol were dissolved in a solution of 876 ml of chloroform and 2.4 ml of pyridine and after cooling the solution to 0°C, 145 ml of a solution of 1.13 M of hydroperoxide of hexafluoroacetone in methylene chloride were added thereto. The solution was poured into 500 ml of 0.1 M sodium thiosulfate and the mixture was extracted with chloroform. The extracts were washed with water and then brought to dryness. The resulting resin was dissolved in a 1-1 mixture of methanol-isopropyl ether and the crystals separating were recovered by filtration to obtain 17.52 g of 3,20-bis-(ethylenedioxy)-5α, 10α-epoxy-19-nor-$\Delta^{9(11)}$-pregnene-17α-ol melting at 206°C.

Analysis:
Calculated: %C 68.87; %H 8.19. Found: %C 68.6; %H 7.9.

STEP C:

3,20-bis-(ethylenedioxy)-19-nor-$\Delta^{9,11}$-pregnadiene-5α,17α-diol 350 mg of 80% potassium tert.-butylate were added to a solution of 209 mg of 3,20-bis-(ethylenedioxy)-5α, 10α-epoxy-19-nor-$\Delta^{9(11)}$-pregnene-17α-ol in 2.5 ml of tetrahydrofuran and the mixture was refluxed for 45 minutes and then cooled. The reaction mixture was poured over ice and then extracted with methylene chloride. The extracts were evaporated to dryness to obtain 210 mg of 3,20-bis-(ethylenedioxy)-19-nor-$\Delta^{9,11}$-pregnadiene-5α, 17α-diol.

IR Spectrum (chloroform):
OH at 3,566 $cm^{-1}$
UV Spectrum (ethanol):
Max. at 245 nm : $E_{1cm}^{1\%}$ = 608 : $\epsilon$ = 25,500.

EXAMPLE 2

3-ethylenedioxy-$\Delta^{9,11}$-estradiene-5α, 17β-diol 350 mg of 80% potassium tert.-butylate were added to a solution of 218 mg of 3-ethylenedioxy-5α, 10α-epoxy-17β-benzoyloxy-$\Delta^{9(11)}$-estrene (prepared as in French Pat. No. 1,550,974) in 2.5 ml of tetrahydrofuran and the mixture was refluxed for 1 ¼hours and then cooled. The mixture was poured into water and extracted with methylene chloride. The extracts were dried, filtered and evaporated to dryness to obtain 140 mg of a resin which was chromatographed over silica with a 1-1 benzene-ethyl acetate eluant to obtain 73 mg of 3-ethylenedioxy-$\Delta^{9,11}$-estradiene-5α, 17β-diol melting at 165°–170°C.

UV Spectrum (ethanol):

Max at 246 mn: $E_{1cm} 1\% = 668 : \epsilon = 22,200$.

EXAMPLE 3

19-nor-$\Delta^{4,9,11}$-pregnatriene-17α-ol-3,20-dione 100 mg of 3,20-bis-(ethylenedioxy)-19-nor-$\Delta^{9,11}$-pregnadiene-5α, 17α-diol were added to a suspension of 2 ml of 95°ethanol and 100 mg of a sulfonic acid resin. The mixture was refluxed for 45 minutes and then was cooled to room temperature. The resin was removed by filtration and the filtrate was evaporated to dryness to obtain 93 mg of 19-nor-$\Delta^{4,9,11}$-pregnatriene-17α-ol-3,20-dione which was chromatographed over silica with a 6-4 benzene-ethyl acetate mixture as eluant.

IR Spectrum (chloroform):

OH at $3,601^{cm-1}$; 20-one at 1,710 and $1,697^{cm-1}$; 3-one at 1,661 and $1,650^{cm-1}$; and C=C at $1,577^{cm-1}$.

UV Spectrum (ethanol):

Max. at 341 nm: $E_{1cm} 1\% = 706 : \epsilon = 22,000$.

Various modifications of the process and products of the invention may be made without departing from the spirit or scope thereof and it is to be understood that the invention is to be limited only as defined in the appended claims.

I claim:

1. A compound having the formula

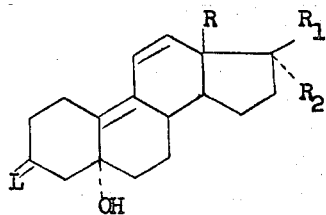

wherein R is alkyl of 1 to 4 carbon atoms, L is a ketal group, $R_1$ is selected from the group consisting of OH, alkoxy of 1 to 5 carbon atoms, alkenyloxy of 2 to 5 carbon atoms, acyloxy of an organic carboxylic acid of 1 to 12 carbon atoms and tetrahydropyranyloxy and $R_2$ is selected from the group consisting of hydrogen, alkyl of 1 to 5 carbon atoms and alkenyl and alkynyl of 2 to 4 carbon atoms or $R_1$ may be acyl of 2 to 4 carbon atoms with the =O in its free form or blocked in the form of a ketal and $R_2$ is selected from the group consisting of hydrogen, —OH and acyloxy or $R_1$ and $R_2$ form a ketalized ketone.

2. A compound of claim 1 wherein the ketal in the 3-position and in the 17- and 20-positions are

groups wherein Z and Y are alkyl of 1 to 4 carbon atoms or taken together are alkylene of 2 to 4 carbon atoms.

3. A compound of claim 1 which is 3,20-bis-(ethylenedioxy)-19-nor-$\Delta^{9,11}$-pregnadiene-5α, 17α-diol.

4. A compound of claim 1 which is 3-ethylenedioxy-$\Delta^{9,11}$-estradiene-5α, 17β-diol.

5. A process for the preparation of a compound of claim 1 comprising reacting reacting a compound of the formula

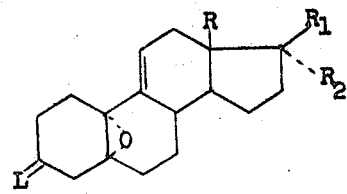

wherein R, $R_1$, $R_2$ and L have the definitions of claim 3 with a strong base in an aprotic dipolar solvent.

* * * * *